United States Patent
Lee et al.

(10) Patent No.: US 7,595,091 B2
(45) Date of Patent: Sep. 29, 2009

(54) METHOD OF FORMING MULTI-DOMAIN ALIGNMENT LAYER

(75) Inventors: Yun Bok Lee, Seoul (KR); Kyeong A. Shin, Gyeonggi-do (KR); Yong Sung Ham, Anyang-si (KR)

(73) Assignee: LG. Display Co., Ltd., Seoul (KR)

( * ) Notice: Subject to any disclaimer, the term of this patent is extended or adjusted under 35 U.S.C. 154(b) by 608 days.

(21) Appl. No.: 10/842,878

(22) Filed: May 10, 2004

(65) Prior Publication Data
US 2004/0227883 A1 Nov. 18, 2004

(30) Foreign Application Priority Data
May 14, 2003 (KR) .................. 10-2003-0030643

(51) Int. Cl.
*B05D 1/32* (2006.01)
*G02F 1/13357* (2006.01)

(52) U.S. Cl. .................. 427/272; 427/282; 349/129; 118/720; 118/721

(58) Field of Classification Search ............... 349/129; 118/720, 721; 427/272, 282
See application file for complete search history.

(56) References Cited

U.S. PATENT DOCUMENTS

| | | | |
|---|---|---|---|
| 5,030,322 A | 7/1991 | Shimada et al. | |
| 5,623,354 A * | 4/1997 | Lien et al. | 349/124 |
| 5,770,826 A | 6/1998 | Chaudhari et al. | |
| 6,020,946 A | 2/2000 | Callegari et al. | |
| 6,061,114 A * | 5/2000 | Callegari et al. | 349/125 |
| 6,061,115 A | 5/2000 | Samant et al. | |
| 6,124,914 A | 9/2000 | Chaudhari et al. | |
| 6,195,146 B1 | 2/2001 | Chaudhari et al. | |
| 6,313,896 B1 * | 11/2001 | Samant et al. | 349/124 |
| 6,331,381 B1 | 12/2001 | Chaudhari et al. | |
| 6,346,975 B2 | 2/2002 | Chaudhari et al. | |
| 2003/0059724 A1* | 3/2003 | Choi | 430/321 |
| 2003/0142257 A1* | 7/2003 | Chaudhari et al. | 349/129 |

FOREIGN PATENT DOCUMENTS

| | | |
|---|---|---|
| JP | 0-230351 | 9/1997 |
| KR | 10-0230532 | 11/1999 |
| KR | 10-20010037225 | 5/2001 |

OTHER PUBLICATIONS

Office Action for Corresponding Korean Patent Application Serial No. 9-5-2007-040818194.

* cited by examiner

*Primary Examiner*—William Phillip Fletcher, III
*Assistant Examiner*—Cachet I Sellman
(74) *Attorney, Agent, or Firm*—Brinks Hofer Gilson & Lione

(57) ABSTRACT

A method of forming an alignment layer with a multi-domain is provided. The alignment layer is formed on a substrate. A mask having a transmission part and a shielding part is aligned over the substrate. First and second alignment directions in the alignment layer are formed by irradiating an ion beam onto the substrate at different irradiation angles. Using the aforementioned ion-beam irradiation process eliminates the need for multiple rubbing processes to create the multi-domain alignment layer.

42 Claims, 9 Drawing Sheets

US 7,595,091 B2

METHOD OF FORMING MULTI-DOMAIN ALIGNMENT LAYER

This application claims the benefit of the Korean Application No. P2003-0030643 filed on May 14, 2003, which is hereby incorporated by reference.

BACKGROUND OF THE INVENTION

1. Field of the Invention

The present invention relates to a method of forming an alignment layer of a liquid crystal display (LCD) device, and more particularly, to a method of forming a multi-domain alignment layer by irradiating ion beam.

2. Description of the Related Art

In general, a cathode ray tube (CRT) has been most widely used among display devices for displaying image information on a screen until now, but has many inconveniences owing to a large volume and weight compared with the display area.

With the development of electronic industries, the display device whose usage was limited to a TV Braun tube and so forth, has been expanded for use in a personal computer, a notebook, a wireless terminal, a vehicle instrument panel, an electronic display board and the like. Also, due to the development of information communication technology, since it is possible to transmit a large amount of image information, the importance on a next generation display device capable of processing and displaying the large amount of image information is constantly increasing.

Many requirements exist for such a next generation display device; the next generation display device must be lighter, slimmer, shorter and smaller, have a high luminance, a large-sized screen, a low power consumption and a low price. Among such next generation display devices, the LCD is recently gaining in popularity.

The LCD has a higher resolution than other flat displays, and a fast response time considerable to that of the CRT in implementing a moving picture.

Due to the high brightness, high contrast, low power consumption characteristics, the LCD is widely used in applications such as a monitor of a desktop computer, a monitor of a notebook computer, a television set, a television set for a vehicle, a navigation system and the like.

Twisted nematic (TN) mode LCDs have become extremely popular and are widely used at the present time.

In the TN mode LCD, directors of liquid crystal molecules adjacent to the lower substrate are perpendicular to directors of liquid crystal molecules adjacent to the upper substrate.

When an electric field is not applied, liquid crystal molecules of the TN mode LCD have a structure in which longer axes of the liquid crystal molecules are twisted in a spiral fashion. The liquid crystal molecules have a pitch and are parallel to the substrate.

Recently, with the advent of the multimedia era, the LCDs performance requirements are constantly increasing. In response, various technologies for realizing wide viewing angle have been developed. However, such technologies have drawbacks such as an increase in the power consumption of the LCD due to a decrease in the aperture ratio, a decrease of the display quality, and problems involving the fabrication method and the like.

In particular, one of the recently developed technologies to secure a wide viewing angle that has rapidly gained popularity is a multi-domain technology in which each unit pixel has regions with different alignment directions.

Herein, when a domain is defined as regions where groups of liquid crystal molecules having the same alignment direction exist, it is said that an LCD with a multi-domain structure has several groups of liquid crystal molecules having different alignment directions.

Thus, when several domains exist in a unit pixel, the respective domains have different alignment directions of liquid crystal molecules, thereby improving the viewing angle.

In particular, the alignment process used to uniformly align liquid crystal molecules is an important factor in determining the normal operation of an LCD and the uniform display characteristic of a picture. Much research has been performed on such alignment processes.

A method of forming a multi-domain alignment layer according to the related art will now be described in more detail with reference to FIGS. 1A through 1E.

The method includes coating a thin polymer film, dividing each unit pixel of the coated thin polymer film into multi-domains, aligning the divided multi-domains in different directions.

The alignment layer is generally formed of a polyimide-based organic material, and is aligned by a rubbing method.

The rubbing method includes: coating a polyimide-based organic material film on a substrate; vaporizing a solvent contained in the coated polyimide-based organic material film at a temperature of 60-80° C.; hardening the polyimide-based organic material film at a temperature of 80-200° C. to form a polyimide alignment layer; and rubbing the polyimide alignment layer using a rubbing cloth such as a velvet in a predetermined direction to form an alignment direction.

As shown in FIG. 1A, an organic film is coated on a substrate 101, and is rubbed in a right-handed direction of the drawing, thereby forming a first alignment layer 103 with a right-handed alignment direction.

As shown in FIG. 1B, a positive photosensitive resin film 105 is coated on the first alignment layer 103.

Next, as shown in FIG. 1C, a mask is arranged over the photosensitive resin film 105, light is irradiated onto the mask, the photosensitive resin film 105 exposed to the light is developed and etched, thereby forming a predetermined pattern.

Next, as shown in FIG. 1D, the exposed portions of the first alignment layer 103 are rubbed in a left-handed direction, thereby having a left-handed alignment direction.

Finally, as shown in FIG. 1E, the photosensitive resin film pattern 105 is removed, thereby forming the alignment layer with a multi-domain structure.

However, the related art method of forming a multi-domain alignment layer using the rubbing method is complicated due to the use of the photolithography process. Also, the alignment layer may be damaged by the use of developer, etchant and the like during the photolithography process. Such an alignment layer may show unstable characteristics.

SUMMARY OF THE INVENTION

Accordingly, the present invention is directed to a method of forming a multi-domain alignment layer that substantially obviates one or more problems due to limitations and disadvantages of the related art.

The present invention provides a method of forming a multi-domain alignment layer by irradiating an ion beam, in which a mask, which is patterned to have a predetermined opening condition and provides a proper ion beam irradiation direction, is designed, thereby obtaining the alignment layer fabricated by a simple process and having superior properties.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

A method of forming a multi-domain alignment layer in one embodiment comprises: forming an alignment layer on a substrate; aligning a mask having a transmission part and a shielding part over the substrate; and forming a first alignment direction and a second alignment direction in the alignment layer by irradiating an ion beam onto the substrate at an irradiation angle of θ.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The present invention will now be described more fully with reference to the accompanying drawings, in which exemplary embodiments of the invention are shown.

Figure 1A:
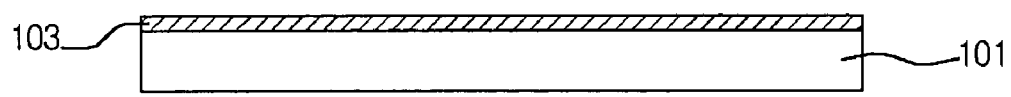
FIGS. 1A through 1E are sectional views illustrating a method of forming a multi-domain alignment layer according to the related art.
Figure 1B:
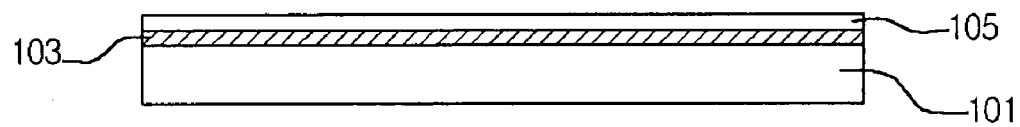
Figure 1C:
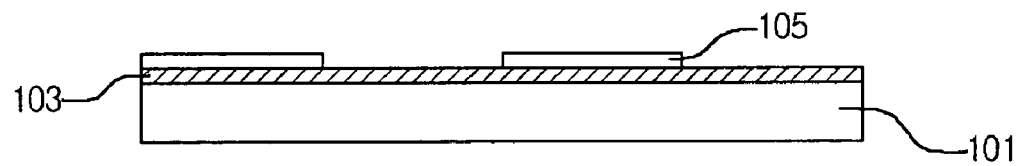
Figure 1D:
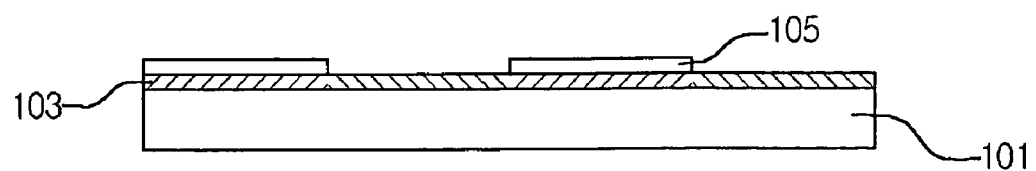
Figure 1E:
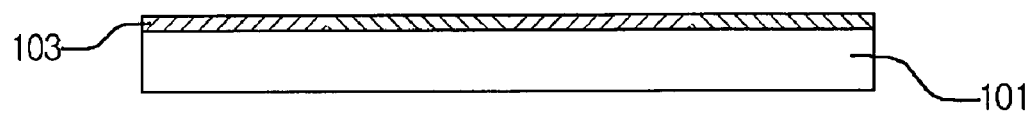
Figure 2A:
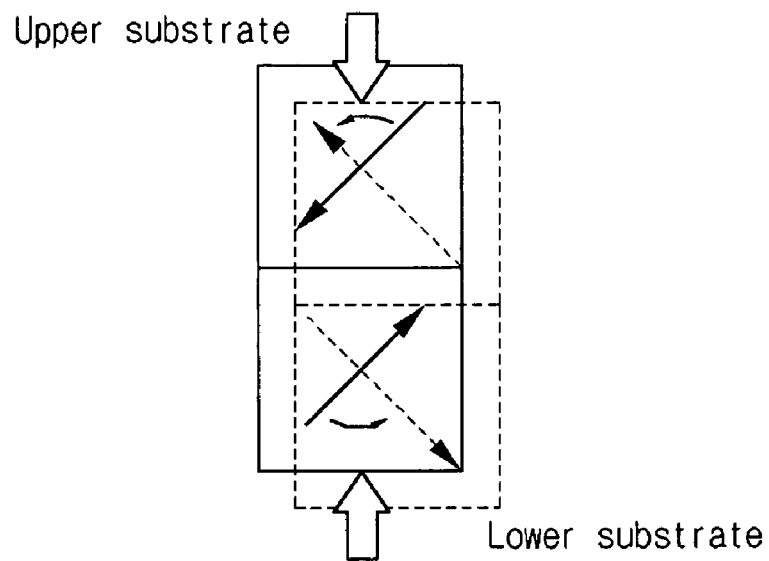
FIGS. 2A through 2C are schematic views of a unit pixel with a multi-domain structure in an LCD according to the present invention.
Figure 2B:
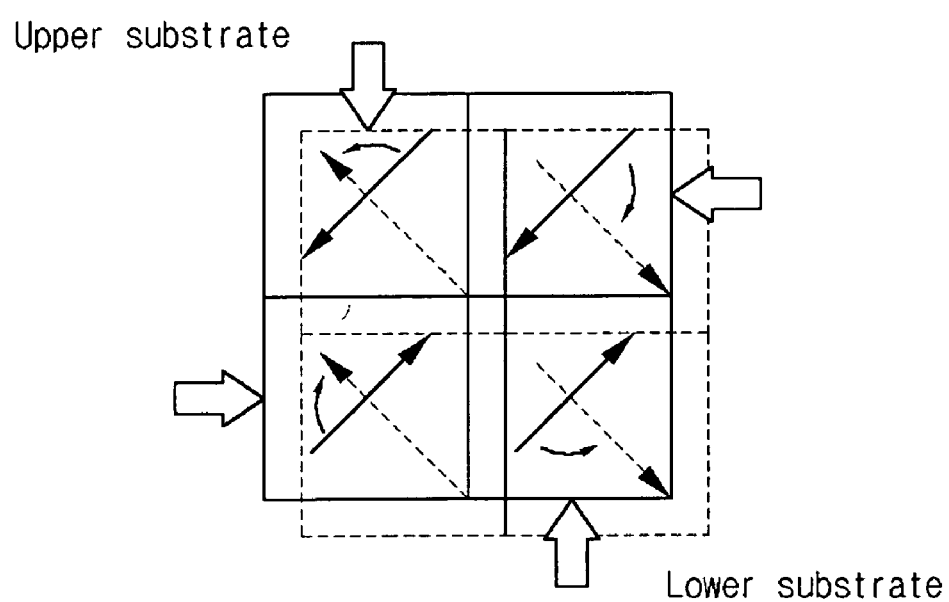
Figure 2C:
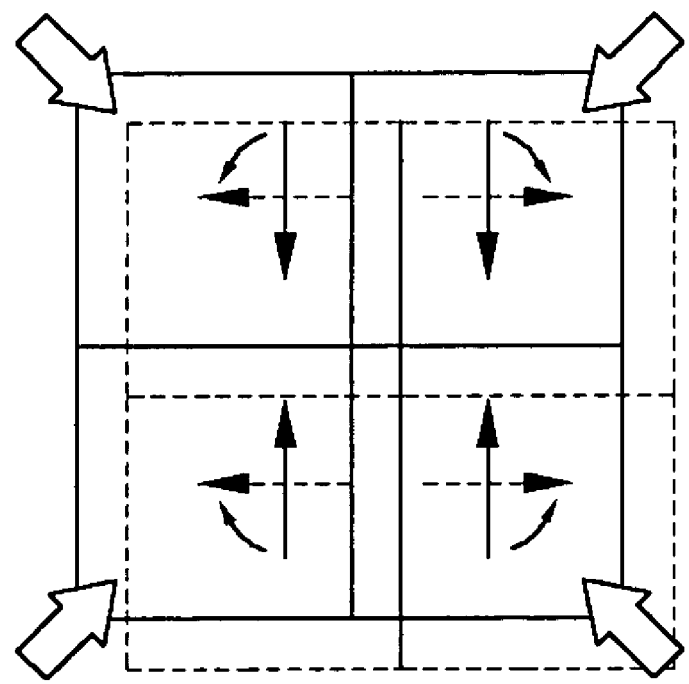

FIGS. 2A through 2C are schematic views of a unit pixel with a multi-domain structure in an LCD according to the present invention. Specifically, FIG. 2A corresponds to a unit pixel, which is divided and aligned into two domains, FIG. 2B corresponds to a unit pixel, which is divided and aligned into four domains, and FIG. 2C is another embodiment of four domains alignment and corresponds to a unit pixel, which is divided and aligned into four domains.

Referring to FIG. 2A, an LCD with a unit pixel consisting of two domains includes an upper substrate, a lower substrate opposing the upper substrate, and a liquid crystal layer interposed between the upper substrate and the lower substrate. In the LCD, each unit pixel on the upper substrate and the lower substrate is divided into two domains and the two domains are aligned in different directions.

Referring to FIGS. 2B and 2C, in an LCD with a unit pixel having four domains, each unit pixel on the upper substrate and the lower substrate is divided into four domains, and first two divided domains are aligned in a first direction and second remaining two domains are aligned in a second direction different from the first direction. The first two domains and the second two domains are designed in a structure to compensate for each other.

In the LCDs with the multi-domain structures described above, when groups of liquid crystal molecules aligned in different directions in a unit pixel region form multi-domains, the viewing angle can be enhanced due to the different alignment directions of the liquid crystal molecules within a unit pixel.

In FIGS. 2B and 2C, a solid line represents an alignment direction of the alignment layer formed on the upper substrate and a dotted line represents an alignment direction of the alignment layer formed on the lower substrate. A large arrow represents a direction of a main viewing angle. By the above construction, each unit pixel has a structure that the divided domains compensate for each other.

Figure 3:
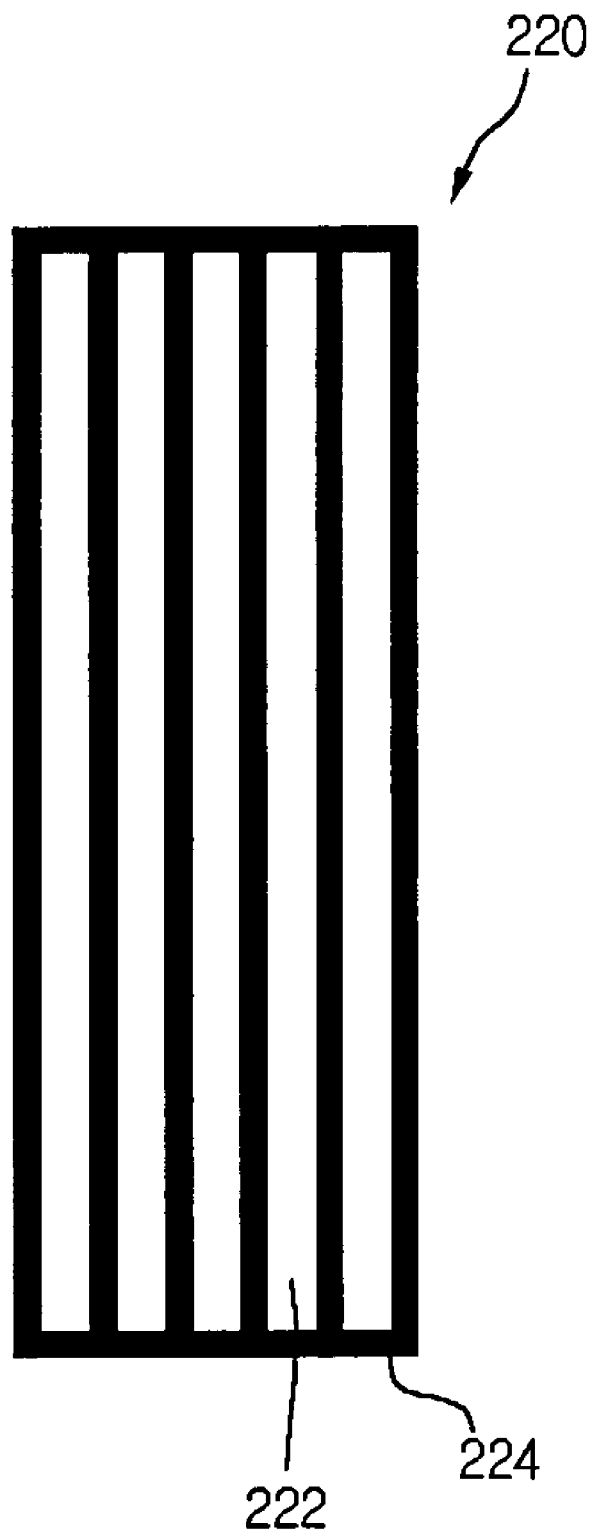
FIG. 3 is a plane view of a mask used in a process of forming an alignment layer by irradiating ion beam according to an embodiment of the present invention.

FIG. 3 is a plan view of a mask used in a process of forming an alignment layer by irradiating ion beam according to an embodiment of the present invention.

In FIG. 3, the mask 220 includes a transmission part 222 and a shielding part 224 to control transmission of ion beam. The shielding part 224 absorbs or reflects an ion beam such that the ion beam does not arrive on the substrate.

The transmission part 222 is shaped in a slit. The transmission part 222 allows transmission of the ion beam, thereby aligning the alignment layer in a particular direction.

By using the mask, a desired multi-domain structure may be formed.

Figure 4A:
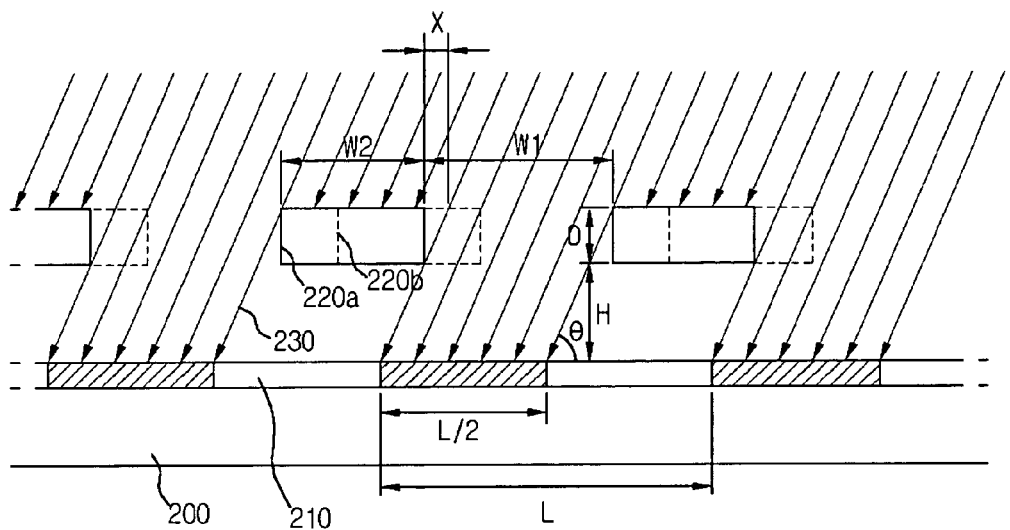
FIGS. 4A and 4B are sectional views schematically illustrating relationship between a mask and a substrate in irradiating ion beam so as to form a multi-domain alignment layer according to the present invention.
Figure 4B:
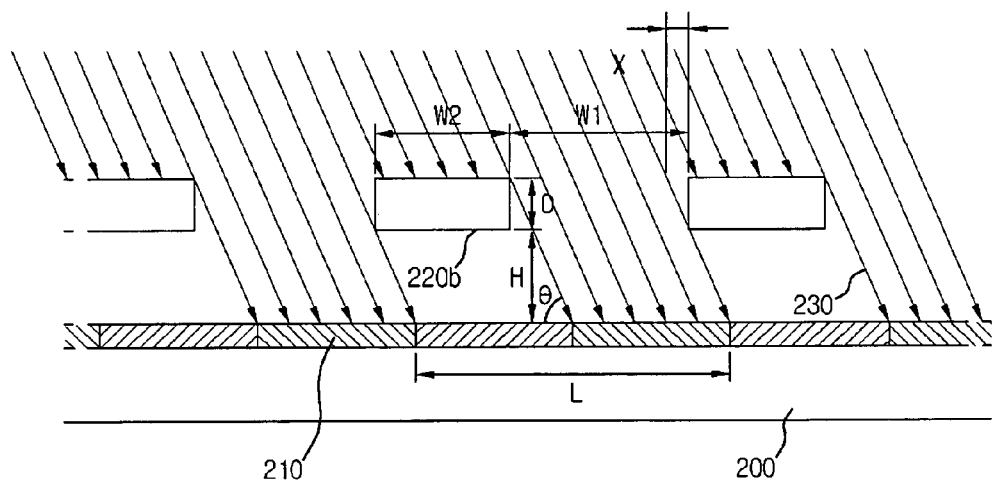

FIGS. 4A and 4B are sectional views schematically illustrating the relationship between the mask and substrate when irradiating the substrate with the ion beam so as to form a multi-domain alignment layer according to the present invention.

First, as shown in FIG. 4A, an alignment layer 210 is formed on a substrate 200. The mask 220a has a pattern including a transmission part and a shielding part corresponding to multi-domains of a unit pixel. The mask 220a is spaced apart by a predetermined distance from the substrate 200.

An ion beam 230 is irradiated onto the substrate 200 with a predetermined irradiation angle (θ). The ion beam 230 arrives on the substrate 200 after passing through the transmission part or is shielded by the shielding part.

The ion beam 230 that has passed through the transmission part of the mask 220a and is irradiated on the substrate 200 aligns exposed portions of the alignment layer 210 in a predetermined direction.

When a size of a unit pixel is L, a width of the transmission part of the mask 220a is w1, a width of the shielding part is w2, an interval between the alignment layer 210 and the mask 220a facing the alignment layer 210 is H, a thickness of the mask 220a is D, and an irradiation angle of the ion beam with respect to a direction parallel to the substrate 200 is θ, these parameters have the following relationships:

Equation 1:

$$\tan\theta = \frac{D+H}{L/4} = \frac{4D+4H}{L}$$

Equation 2:

$$\theta = \tan^{-1}\frac{4D+4H}{L} \quad \left(0 \le \theta \le \frac{\pi}{2}\right)$$

Equation 3:

$$W1 + W2 = L$$

Equation 4:

$$W1 = \frac{L}{2} + X = \frac{L}{2} + \frac{D}{\tan\theta} = \frac{L}{2} + \frac{L*D}{4D+4H}$$

In the above, so as to align a unit pixel into multi-domains having an identical size (L/2), the mask 220a should satisfy the above equation 1.

When equation 2 is satisfied by equation 1, the ion beam is irradiated in the form of a straight line, so that a sum of the transmission part of the mask 220a and the shielding part of the mask 220a becomes equal to the size of the pixel.

Also, since the mask 220a has the thickness of D, the width w1 of the transmission part of the mask 220a can be expressed by equation 4 when considering a margin X shielded by the thickness D of the mask 220a in the size L/2 of the alignment layer aligned by the ion beam 230 passing through the transmission part at an irradiation angle.

To align the alignment layer in an opposite direction to the initial alignment direction using the mask 220a satisfying the equations 1 through 4, the ion beam 230 is irradiated onto the substrate 200 after the substrate 200 is rotated or the mask 220a is moved. In the case of the opposite alignment direction, the above equations 1 through 4 should be satisfied.

After first portions of the alignment layer 210 are aligned in a first direction by irradiating an ion beam onto the substrate 200 using the mask 220a arranged as shown in FIG. 4A, the mask 220b is rearranged as shown in FIG. 4B and the ion beam is again irradiated onto the substrate, so that second portions of the alignment layer 210, which are not exposed to the ion beam during the first irradiation, are aligned in a second direction opposite to the first direction.

At this time, since the mask 220b has the thickness D and the ion beam 230 is irradiated with an irradiation angle θ, the mask 220b is shifted to a direction parallel to the substrate in consideration of the thickness of the mask and the irradiation angle of the ion beam and rearranged to a new position.

After the mask 220b is rearranged, the ion beam is irradiated onto the substrate 200, so that the second portions of the alignment layer 210 are aligned in the second direction.

The two domains of each unit pixel, which are aligned in different directions, have an identical size of L/2.

When assuming that the size L of the unit pixel is constant, since the thickness D of the mask 220b and the interval H between the alignment layer 210 and the mask 220b are varied, the irradiation angle θ of the ion beam 230 and the width w1 of the transmission part of the mask 220b may be obtained as follows:

In equation 2, $$\lim_{h\to 0}\theta = \lim_{h\to 0}\tan^{-1}\frac{4D+4H}{L} = \tan^{-1}\frac{4D}{L}$$

$$\lim_{d\to 0}\theta = \lim_{d\to 0}\tan^{-1}\frac{4D+4H}{L} = \tan^{-1}\frac{4H}{L}$$

$$\lim_{h\to\infty}\theta = \lim_{h\to\infty}\tan^{-1}\frac{4D+4H}{L} = \frac{\pi}{2}$$

$$\lim_{d\to\infty}\theta = \lim_{d\to\infty}\tan^{-1}\frac{4D+4H}{L} = \frac{\pi}{2}$$

Accordingly, the irradiation angle θ of the ion beam is expressed by the equation below:

$$\tan^{-1}\frac{4D}{L} \le \theta \le \frac{\pi}{2} \text{ or}$$

$$\tan^{-1}\frac{4H}{L} \le \theta \le \frac{\pi}{2}.$$

In equation 4, $$\lim_{h\to 0}W1 = \lim_{h\to 0}\left[\frac{L}{2} + \frac{L\times D}{4D+4H}\right] = \frac{3}{4}L$$

$$\lim_{d\to 0}W1 = \lim_{d\to 0}\left[\frac{L}{2} + \frac{L\times D}{4D+4H}\right] = \frac{L}{2}$$

$$\lim_{h\to\infty}W1 = \lim_{h\to\infty}\left[\frac{L}{2} + \frac{L\times D}{4D+4H}\right] = \frac{L}{2}$$

$$\lim_{d\to\infty}W1 = \lim_{d\to\infty}\left[\frac{L}{2} + \frac{L\times D}{4D+4H}\right] = \frac{3}{4}L$$

Hence, the width w1 of the transmission part of the mask has a relationship of $$\frac{L}{2} \le W1 \le \frac{3}{4}L.$$

Figure 5:
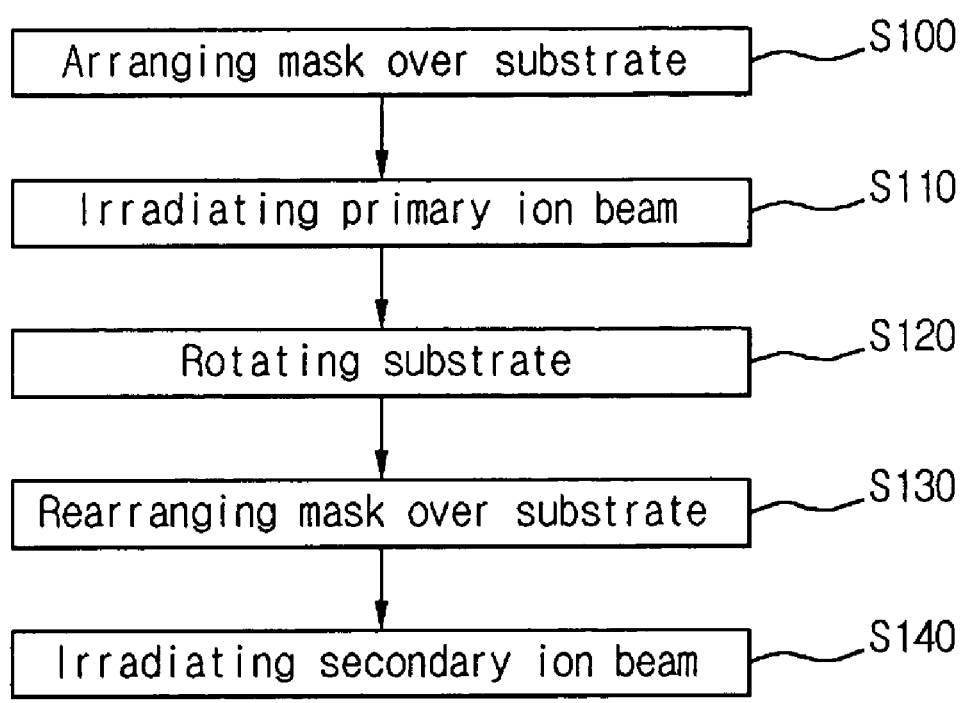
FIG. 5 is a flow diagram illustrating a method of forming a multi-domain alignment layer according to an embodiment of the present invention.

FIG. 5 is a flow diagram illustrating a method of forming a multi-domain alignment layer according to an embodiment of the present invention, and FIGS. 6A through 6D are sectional views schematically illustrating a method of forming a multi-domain alignment layer according to an embodiment of the present invention.

Figure 6A:
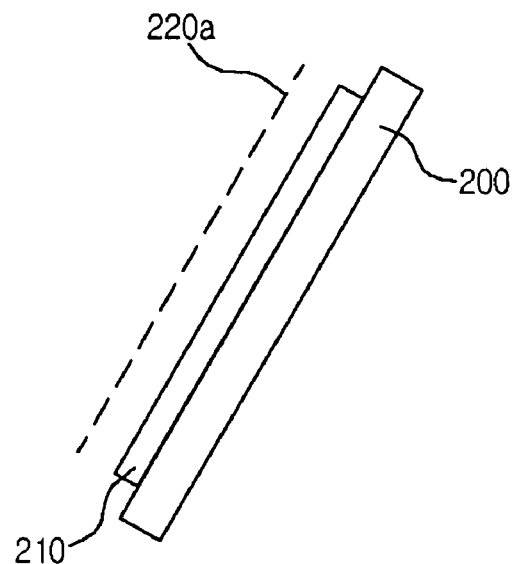
FIGS. 6A through 6D are sectional views schematically illustrating a method of forming a multi-domain alignment layer according to an embodiment of the present invention.

Referring to FIG. 6A, a substrate 200 for an LCD is prepared and a mask 220a having predetermined patterns is arranged spaced apart from the substrate 200 by a predetermined interval (S100).

The substrate 200 has TFTs or color filters formed thereon.

A tilt angle of liquid crystal molecule is determined by inclining the substrate 200 with respect to an irradiated ion beam by a predetermined angle.

Then, an alignment layer 210 is formed on the substrate 200.

At this time, the mask 220a has predetermined slit pattern that is formed corresponding to multi-divided areas with respect to a unit pixel of the substrate 200. The mask 220a is arranged spaced apart from the substrate 200 by a predetermined interval.

Figure 6B:
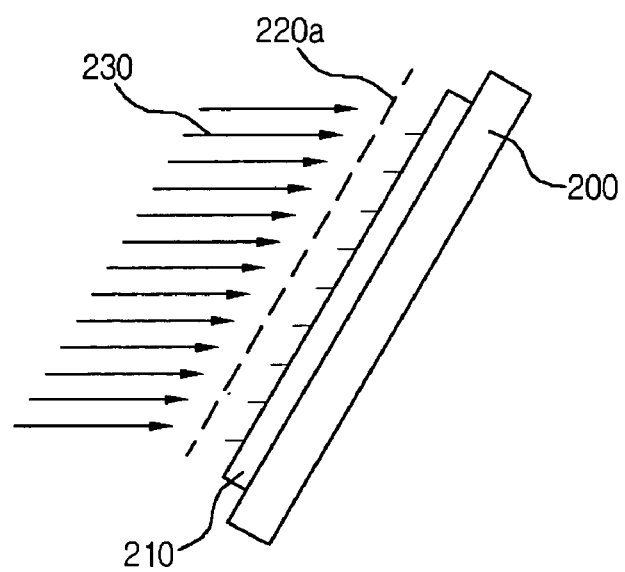

Referring to FIG. 6B, the substrate 200 is loaded on an ion beam irradiation apparatus, and a primary ion beam 230 is irradiated onto the substrate 200 (S110).

The irradiated ion beam 230 passes through the mask 220a having the slit pattern and reach the substrate 200. Thus, the alignment layer 210 exposed to the ion beams 230 is aligned in a predetermined direction.

Meanwhile, when the alignment layer 210 formed of organic material such as polyimide is formed on the substrate 200, the polyimide is divided into a main chain and a side chain in view of a chemical structure. The main chain functions to align liquid crystal molecules in a single alignment direction and the side chain functions to form a tilt angle.

The alignment layer 210 may be formed of an inorganic material such as $SiO_2$, SiC, $Si_3N_4$, $Al_2O_3$, $CeO_2$, $SnO_2$, glass, $ZnTiO_2$, diamond-like carbon (DLC), or the like.

The mask 220a includes the slit pattern that has a predetermined transmission part and a predetermined shielding part. In the mask 220a constructed as above, the alignment layer 210 is aligned on only some divided areas of the pixel cell due to the ion beams 230, which pass through the slit of the mask 220a.

Then, the irradiated primary ion beam 230 is shielded and the substrate 200 is then rotated (S120).

Here, the substrate 200 may be rotated up and down.

Figure 6C:
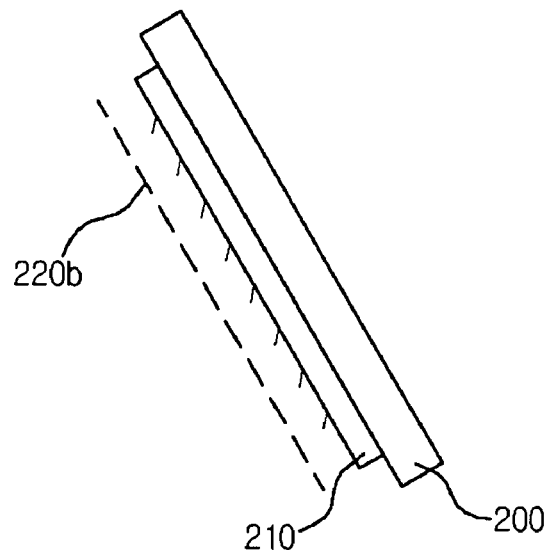

Referring to FIG. 6C, the substrate 200 inclined with respect to the irradiated ion beams 230 is arranged inclined in an opposite direction.

At this time, a mask 220b that is arranged spaced apart from the substrate 200 is re-arranged (S130).

The mask 220b has a slit pattern and may shield a secondary ion beam that is irradiated on the areas aligned due to the primary ion beam at the alignment layer 210.

Here, the mask 220a used in the irradiation of the primary ion beams may be used as the mask 220b by shifting the mask 220a. Also, as the mask 220b, another mask may be used by spacing it apart from the substrate 200 and re-arranging it.

Figure 6D:
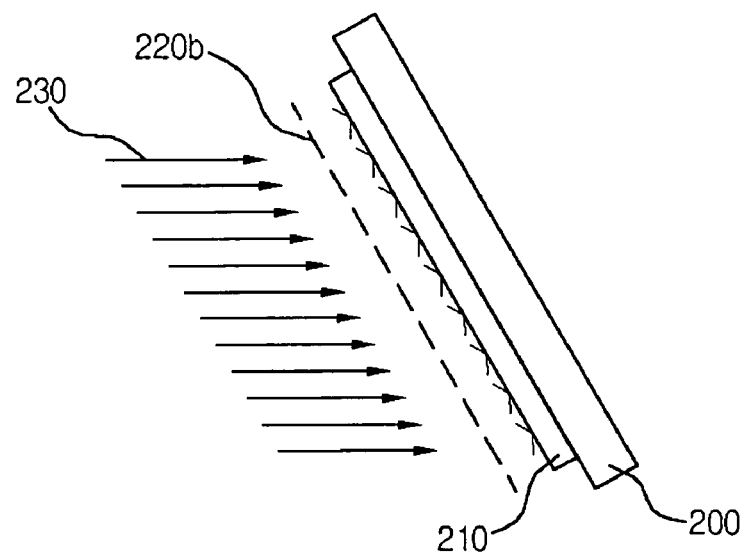

Referring to FIG. 6D, the substrate 200 is re-arranged in the above manner and secondary ion beams 230 are irradiated (S140).

The irradiated secondary ion beam 230 passes through the mask 220b having the slit pattern and reach the substrate 200. Thus, the alignment layer 210 exposed to the secondary ion beam 230 is aligned in a predetermined direction.

Here, the ion beams 230 passing through the slit of the mask 220b cause only some divided areas of the unit pixel to be aligned in a direction opposite to an alignment direction formed in the irradiation of the primary ion beam.

In other words, the alignment direction formed by irradiating the primary ion beam onto the alignment layer 210 is opposite to that formed by irradiating the secondary ion beam.

In this manner, it is possible to perform the multi alignment process within each unit pixel of the substrate 200 by irradiating the primary ion beam 230 onto the alignment layer 210, rotating the substrate 200 and then irradiating the secondary ion beam 230.

According to the method of forming a multi-domain alignment layer through the irradiation of ion beams on the alignment layer in the LCD, the mask having an appropriate thickness, transmission part and shielding part is arranged at a front of the alignment layer. Then, relations among width of the transmission part of the mask, pixel size, thickness of the mask, distance between the alignment layer and the mask, and ion beam irradiation angle are provided. Thus, the multi-alignment process may be performed effectively, thereby simplifying the manufacturing process and reducing the manufacturing cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of forming a multi-domain alignment layer, the method comprising:
    forming an alignment layer on a substrate;
    aligning a mask having a transmission part and a shielding part over the substrate, the mask having a thickness D; and
    forming a first alignment direction in the alignment layer by irradiating an ion beam onto the substrate at an irradiation angle of θ, wherein the thickness D of the mask is determined by the following equation:

$$D = \frac{L}{4}\tan\theta - H,$$

where H is an interval between the mask and the alignment layer, and L is a pixel size;
   rotating the substrate;
   aligning and shifting the mask over the substrate; and
   forming a second alignment direction in the alignment layer by irradiating the ion beam onto the substrate,
   wherein the mask is shifted to a direction parallel to the substrate in consideration of the thickness of the mask and the irradiation angle of the ion beam.

2. The method according to claim 1, wherein the transmission part of the mask has a width greater than or equal to L/2.

3. The method according to claim 1, wherein the transmission part of the mask has a width smaller than or equal to 3L/4.

4. The method according to claim 1, wherein the irradiation angle of θ has a relationship of $\tan^{-1}4D/L \leq \theta \leq \pi/2$ or $\tan^{-1}4H/L \leq \theta \leq \pi/2$.

5. The method according to claim 1, wherein a sum of a width of the transmission part and a width of the shielding part is equal to the pixel size.

6. The method according to claim 1, wherein a region corresponding to the first alignment direction has a first area and a region corresponding to the second alignment direction has a second area, and the first area is equal to the second area.

7. The method according to claim 1, wherein the alignment layer comprises at least one of an organic material and an inorganic material.

8. The method according to claim 1, wherein the mask has a slit pattern.

9. The method according to claim 1, wherein the first alignment direction is opposite to the second alignment direction.

10. The method according to claim 1, wherein the forming the second alignment direction is performed by irradiating the ion beam at the irradiation angle of θ in an opposite direction to the first alignment direction.

11. The method according to claim 1, wherein the forming the second alignment direction is performed by tilting the substrate in an opposite direction to an original alignment direction of the substrate and irradiating the ion beam at the irradiation angle of θ with respect to a parallel direction to the substrate.

12. The method according to claim 1, wherein the forming the second alignment direction is performed by arranging another mask at a predetermined position.

13. A method of forming a multi-domain alignment layer, the method comprising:

aligning a first mask over an alignment layer on a substrate, the first mask containing a transmission part and a shielding part, and the first mask having a thickness D;

irradiating first different regions of the alignment layer to form first different alignment directions in the first different regions using an ion beam, wherein the thickness D of the first mask is determined by the following equation:

$$D = \frac{L}{4}\tan\theta - H,$$

where H is an interval between the first mask and the alignment layer, and L is a pixel size;

rotating the substrate;

aligning and shifting a second mask over the alignment layer; and irradiating second different regions of the alignment layer to form second different alignment directions in the second different regions using the ion beam, wherein the second mask is shifted to a direction parallel to the substrate in consideration of thickness of the second mask and an irradiation angle of the ion beam.

14. The method according to claim 13, wherein the first different regions are formed in a unit pixel.

15. The method according to claim 14, wherein the first different regions are substantially symmetrical in the unit pixel.

16. The method according to claim 13, wherein the first different regions have substantially same size.

17. The method according to claim 13, further comprising irradiating the first different regions at different angles relative to normal to the substrate.

18. The method according to claim 17, wherein the angles are substantially symmetrical to the normal to the alignment layer.

19. The method according to claim 13, wherein the first alignment directions of the first different regions are opposite to each other.

20. The method according to claim 13, further comprising adjusting a position of the first mask relative to the substrate between forming a first region of the different regions and forming a second region of the different regions.

21. The method according to claim 20, further comprising adjusting a lateral position of the first mask relative to the substrate.

22. The method according to claim 21, further comprising maintaining substantially the same distance between the first mask and the substrate.

23. The method according to claim 20, further comprising adjusting a distance between the first mask and the substrate.

24. The method according to claim 23, further comprising maintaining substantially the same lateral position of the first mask relative to the substrate.

25. The method according to claim 13, wherein the first and second masks have different external dimensions.

26. The method according to claim 13, wherein the first and second masks have different internal dimensions.

27. The method according to claim 13, further comprising adjusting a position of the second mask relative to a position of the first mask.

28. The method according to claim 27, further comprising adjusting a lateral position of the second mask relative to a lateral position of the first mask.

29. The method according to claim 28, further comprising using substantially the same distance between the second mask and the substrate that was used between the first mask and the substrate.

30. The method according to claim 27, further comprising using a distance between the second mask and the substrate that is different from a distance that was used between the first mask and the substrate.

31. The method according to claim 30, further comprising using substantially the same lateral position between the second mask and the substrate that was used between the first mask and the substrate.

32. The method according to claim 13, further comprising ion beam-irradiating the alignment layer to form the first different regions.

33. The method according to claim 32, further comprising irradiating the alignment layer using substantially the same ion dosage to form the first different regions.

34. The method according to claim 13, further comprising forming the first different regions without rubbing the alignment layer.

35. The method according to claim 13, wherein the transmission part has a width grater than or equal to one half of the pixel size.

36. The method according to claim 13, wherein the transmission part has a width smaller than or equal to three quarters of the pixel size.

37. The method according to claim 13, further comprising irradiating the alignment layer at angle of $\tan^{-1} 4D/L \leq \theta \leq \pi/2$ or $\tan^{-1} 4H/L \leq \theta \leq \pi/2$.

38. The method according to claim 13, wherein a sum of a width of the transmission part and a width of the shielding part is equal to the pixel size.

39. The method according to claim 13, further comprising irradiating an alignment layer comprising at least one of an organic material and an inorganic material.

40. The method according to claim 13, further comprising using a mask that has a slit pattern.

41. The method according to claim 1,
wherein the thickness D of the mask is determined by the following equation:

$$D = \frac{L}{4}\tan\theta - H,$$

where H is an interval between the mask and the alignment layer, and L is a pixel size.

42. The method according to claim 13, wherein the ion beam used to irradiate the different regions is maintained substantially at the same direction at an irradiation angle of θ, and the thickness D of the first mask is determined by the following equation:

$$D = \frac{L}{4}\tan\theta - H,$$

where H is an interval between the first mask and the alignment layer, and L is a pixel size.

* * * * *

UNITED STATES PATENT AND TRADEMARK OFFICE
CERTIFICATE OF CORRECTION

PATENT NO. : 7,595,091 B2  Page 1 of 1
APPLICATION NO. : 10/842878
DATED : September 29, 2009
INVENTOR(S) : Yun Bok Lee et al.

It is certified that error appears in the above-identified patent and that said Letters Patent is hereby corrected as shown below:

In the Claims

In column 10, claim 35, line 23, after "part has a width" replace "grater" with --greater--.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,595,091 B2
APPLICATION NO. : 10/842878
DATED : September 29, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Twenty-eighth Day of September, 2010

David J. Kappos
*Director of the United States Patent and Trademark Office*